(12) United States Patent
Naruse et al.

(10) Patent No.: US 7,308,834 B2
(45) Date of Patent: Dec. 18, 2007

(54) TORQUE SENSOR AND ELECTRIC STEERING DEVICE USING THE SAME

(75) Inventors: Mitsunori Naruse, Okazaki (JP); Yuji Yoshizawa, Nisshin (JP); Yusuke Mochizuki, Okazaki (JP)

(73) Assignee: JTEKT Corporation, Osaka (JP)

( * ) Notice: Subject to any disclaimer, the term of this patent is extended or adjusted under 35 U.S.C. 154(b) by 89 days.

(21) Appl. No.: 11/388,045

(22) Filed: Mar. 24, 2006

(65) Prior Publication Data

US 2006/0162469 A1 Jul. 27, 2006

Related U.S. Application Data

(62) Division of application No. 10/809,362, filed on Mar. 26, 2004, now Pat. No. 7,059,204.

(30) Foreign Application Priority Data

Mar. 27, 2003 (JP) ............................. 2003-087072
Mar. 27, 2003 (JP) ............................. 2003-087073

(51) Int. Cl.
  *G01L 3/02* (2006.01)
(52) U.S. Cl. ................................. 73/862.331
(58) Field of Classification Search ................................. 73/862.331–862.333
  See application file for complete search history.

(56) References Cited

U.S. PATENT DOCUMENTS

| 5,871,064 A | 2/1999 | Suzuki et al. |
| 6,467,567 B2 | 10/2002 | Kobayashi et al. |
| 6,701,792 B2 * | 3/2004 | Laidlaw ............ 73/862.329 |
| 6,892,588 B2 | 5/2005 | Nagase et al. |
| 6,901,816 B2 | 6/2005 | Yamaguchi |

(Continued)

FOREIGN PATENT DOCUMENTS

EP  0 787 640 A2  8/1997

(Continued)

*Primary Examiner*—Max Noori
(74) *Attorney, Agent, or Firm*—Oblon, Spivak, McClelland, Maier & Neustadt, P.C.

(57) ABSTRACT

A torque sensor is provided with a torsion bar, first and second elongate sleeves respectively secured to one and the other ends of the torsion bar, and a pair of resolvers respectively mounted on the first and second elongate sleeves. First and second stop portions are provided respectively at overlapping portions of the first and second elongate sleeves where the second elongate sleeve is fit partly on the external surface of the first elongate sleeve with a play. A rotary sleeve given to one of the resolvers is press-fit on the external surface of the stop portion provided on the second elongate sleeve for mounting one of the resolvers thereon as well as for reinforcing the mechanical strength of the stop portion provided on the second elongate sleeve. Further, the resolvers used therein are chosen as those respectively having n-poles and m-poles. Where the torsional angle of the torsion bar is represented by symbol "$\theta$", the first and second stop portions are constructed to satisfy an expression ($\theta < 180° |1/n - 1/m|$). The torsional angle of the torsion bar is limited to being smaller than the angle determined by the expression, and hence, the resolvers are prevented from having the same values in their electrical angles, so that incorrect detection in torque can be obviated.

2 Claims, 4 Drawing Sheets

U.S. PATENT DOCUMENTS

| | | |
|---|---|---|
| 6,935,194 B2 | 8/2005 | Matsuura et al. |
| 7,059,204 B2 * | 6/2006 | Naruse et al. ......... 73/862.326 |
| 7,073,398 B2 * | 7/2006 | Kondo et al. .......... 73/862.326 |
| 2005/0028613 A1 | 2/2005 | Onoda et al. |
| 2005/0065686 A1 | 3/2005 | Kohno et al. |

FOREIGN PATENT DOCUMENTS

| | | |
|---|---|---|
| JP | 57-209470 | 12/1982 |
| JP | 10-328952 | 12/1998 |
| JP | 2001-194251 | 7/2001 |
| JP | 2002-350181 | 12/2002 |

* cited by examiner

TORQUE SENSOR AND ELECTRIC STEERING DEVICE USING THE SAME

INCORPORATION BY REFERENCE

This application is based on and claims priority under 35 U.S.C. sctn. 119 with respect to Japanese Applications No. 2003-087072 and No. 2003-087073 both filed on Mar. 27, 2003, the entire contents of which are incorporated herein by reference.

BACKGROUND OF THE INVENTION

1. Field of the Invention

The present invention relates to a torque sensor capable of detecting a torque by detecting the torsional angle of a torsion bar by the use of a pair of resolvers. It also relates to an electric steering device provided with such a torque sensor.

2. Discussion of the Related Art

As described for example in Japanese unexamined, published patent application No. 10-328952 (1998-328952), a resolver is provided on a servomotor and works to detect the rotational angle thereof. In recent years, there has been under development a torque sensor which is capable of detecting the torsional angle of a torsion bar provided inside a cylindrical body, in the form of electrical angles of a pair of resolvers different in the number of poles and which is capable of detecting a load torque corresponding to the torsional angle of the torsion bar, based on the difference between the electrical angles.

However, in the torque sensor of the aforementioned type, when the torsion bar is twisted beyond a predetermined angle, there arises a problem that the torque cannot be detected correctly because the difference between the electrical angles with the torsion bar twisted in a positive-going direction may become the same as that therebetween with the torsion bar twisted in a negative-going direction.

Further, in the aforementioned torque sensor, it is required to provide means for preventing the torsion bar from being twisted excessively, in which case it becomes a problem how to make such means downsized or miniaturized.

SUMMARY OF THE INVENTION

Accordingly, it is a primary object of the present invention to provide an improved torque sensor capable of detecting a torque more correctly than the prior art does.

It is also a primary object of the present invention to provide an improved torque sensor capable of downsizing or miniaturizing the construction of means for preventing a torsion bar from being twisted excessively.

Another object of the present invention is to provide an electric steering device incorporating such an improved torque sensor.

Briefly, according to the present invention, there is provided a torque sensor having a torsion bar rotatably provided inside a cylindrical body, a pair of resolvers different in the number of poles for detecting the torsional angle of the torsion bar in the form of electrical angles thereof, and means for measuring a load torque corresponding to the torsional angle of the torsion bar, based on the difference between the detected electrical angles. A stop mechanism is provided for defining the maximum torsional angle of the torsion bar. Where the numbers of poles of the resolvers are represented respectively by symbols "n" and "m" and the torsional angle is represented by symbol "$\theta$", then the stop mechanism is constructed to satisfy the following expression.

$$\theta < 180 \cdot |1/n - 1/m|$$

With this construction, in the resolver of the n-poles, an angular range of 360°/n in mechanical angle covers an angular range of 0° through 360° in electrical angle, while in the resolver of the m-poles, an angular range of 360°/m in mechanical angle covers an angular range of 0° through 360° in electrical angle. Therefore, the difference in the mechanical angle for the n-pole resolver and the m-pole resolver to vary 360° in the electrical angle is:

$$\Delta\theta = 360° \cdot |1/n - 1/m|$$

Accordingly, where the torsional angle ($\theta$) of the torsion bar is to be detected by the pair of resolvers, it is desirable that the torsional angle ($\theta$) of the torsion bar is limited to an angular range smaller than $\pm\Delta\theta/2$. That is, the torsional angle ($\theta$) of the torsion bar is desired to be twisted within an angular range defined by the following expression.

$$\theta < 180 \cdot |1/n - 1/m|$$

Thus, the torque detection can be done more correctly in the present invention than it is done in the prior art technology. The torque sensor so improved can be used as being assembled in an electric steering device.

In another aspect of the present invention, there is also provided a torque sensor having a torsion bar rotatably provided inside a cylindrical body, a pair of resolvers different in the number of poles for detecting the torsional angle of the torsion bar in the form of electrical angles thereof, and means for measuring a load torque corresponding to the torsional angle of the torsion bar, based on the difference between the detected electrical angles. The torque sensor comprises a first elongate sleeve fit on an axial mid portion of the torsion bar with a play and secured to one end portion of the torsion bar and a second elongate sleeve fit on the outer surface of the first elongate sleeve with a play and secured to the other end portion of the torsion bar. Stop portions are formed respectively on portions of the first and second elongate sleeves which overlap with each other with the play, to be brought into engagement with each other when the torsion bar is twisted a predetermined angle. A rotary sleeve given to one of the resolvers is fit on the external surface of the stop portion of the second elongate sleeve for reinforcing the mechanical strength of the second elongate sleeve.

With this construction, the stop portions are provided respectively on the overlapping portions of the first and second elongate sleeves which are respectively secured to both end portions of the torsion bar, and the rotary sleeve given to one of the resolvers is fit on the external surface of the stop portion of the second elongate sleeve for reinforcing the mechanical strength of the second elongate sleeve. Therefore, the construction of the torque sensor can be downsized or miniaturized as a whole compared to that wherein such a rotary sleeve is not used also for the reinforcement of the second elongate sleeve.

BRIEF DESCRIPTION OF THE ACCOMPANYING DRAWINGS

The foregoing and other objects and many of the attendant advantages of the present invention may readily be appreciated as the same becomes better understood by reference to a preferred embodiment of the present invention when considered in connection with the accompanying drawings, wherein like reference numerals designate the same or corresponding parts throughout several views, and in which.

Figure 4A:
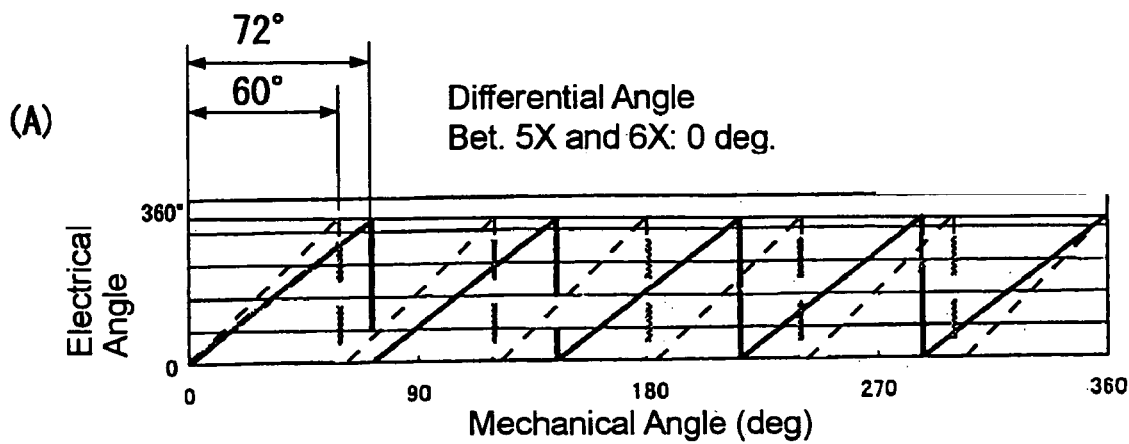
Figure 4B:
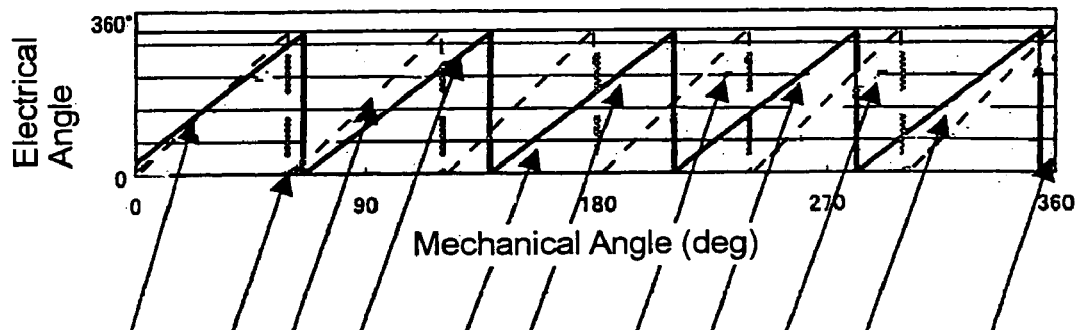
Figure 4C:
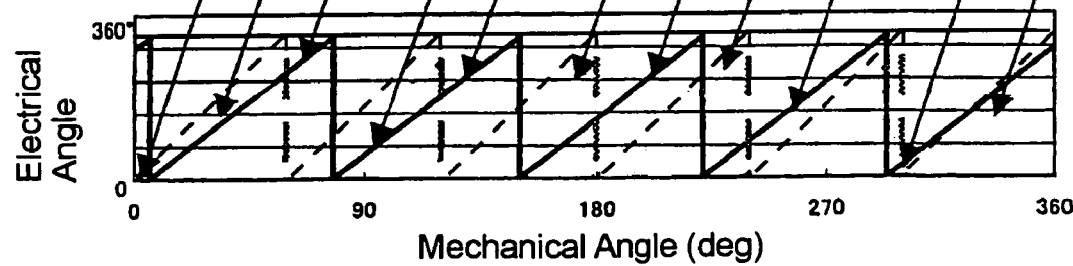
Figure 5:
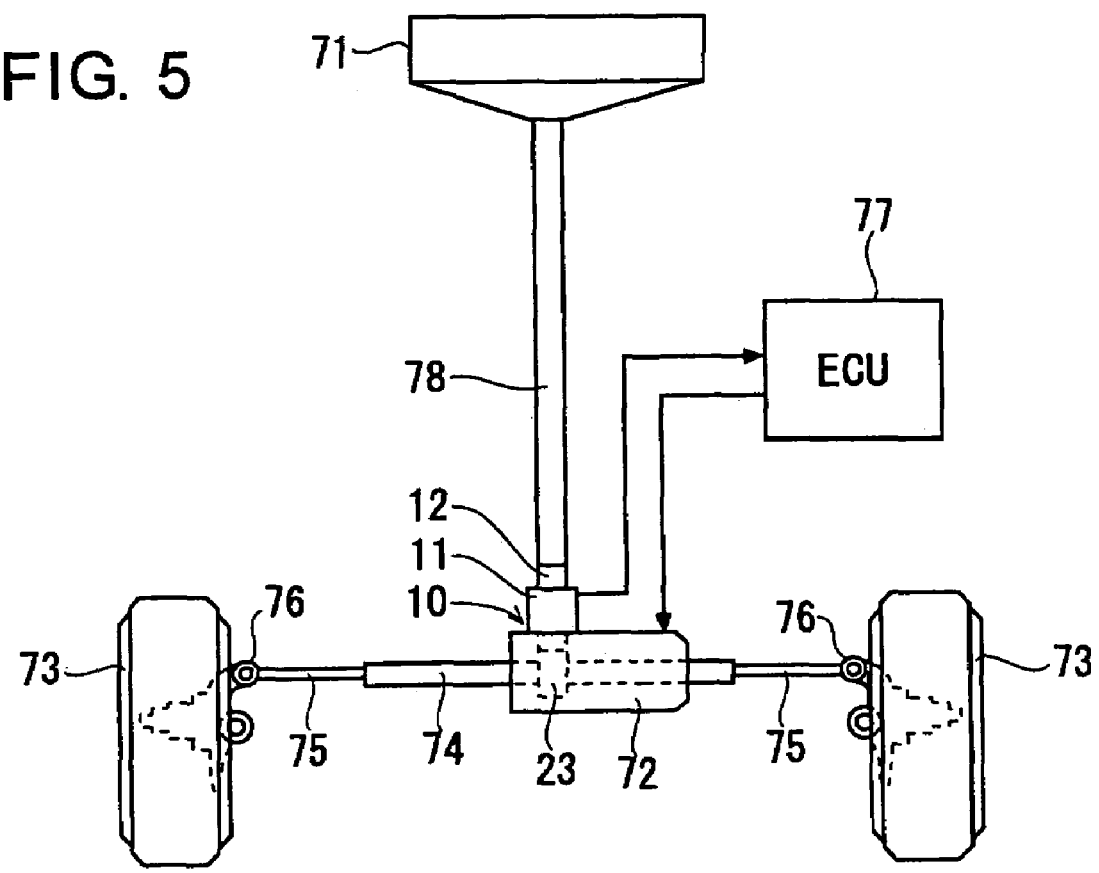

FIGS. 4(A), 4(B) and 4(C) are graphs respectively showing the relations between the electrical angles and the mechanical angles of a 5-pole resolver and a 6-pole resolver in the respective states that the angular differential is 0 degree, 6 degrees and −6 degrees; and FIG. 5 is a schematic view of an electric power steering device incorporating therein the torque sensor according to the present invention.

DETAILED DESCRIPTION OF THE PREFERRED EMBODIMENT

Figure 1:
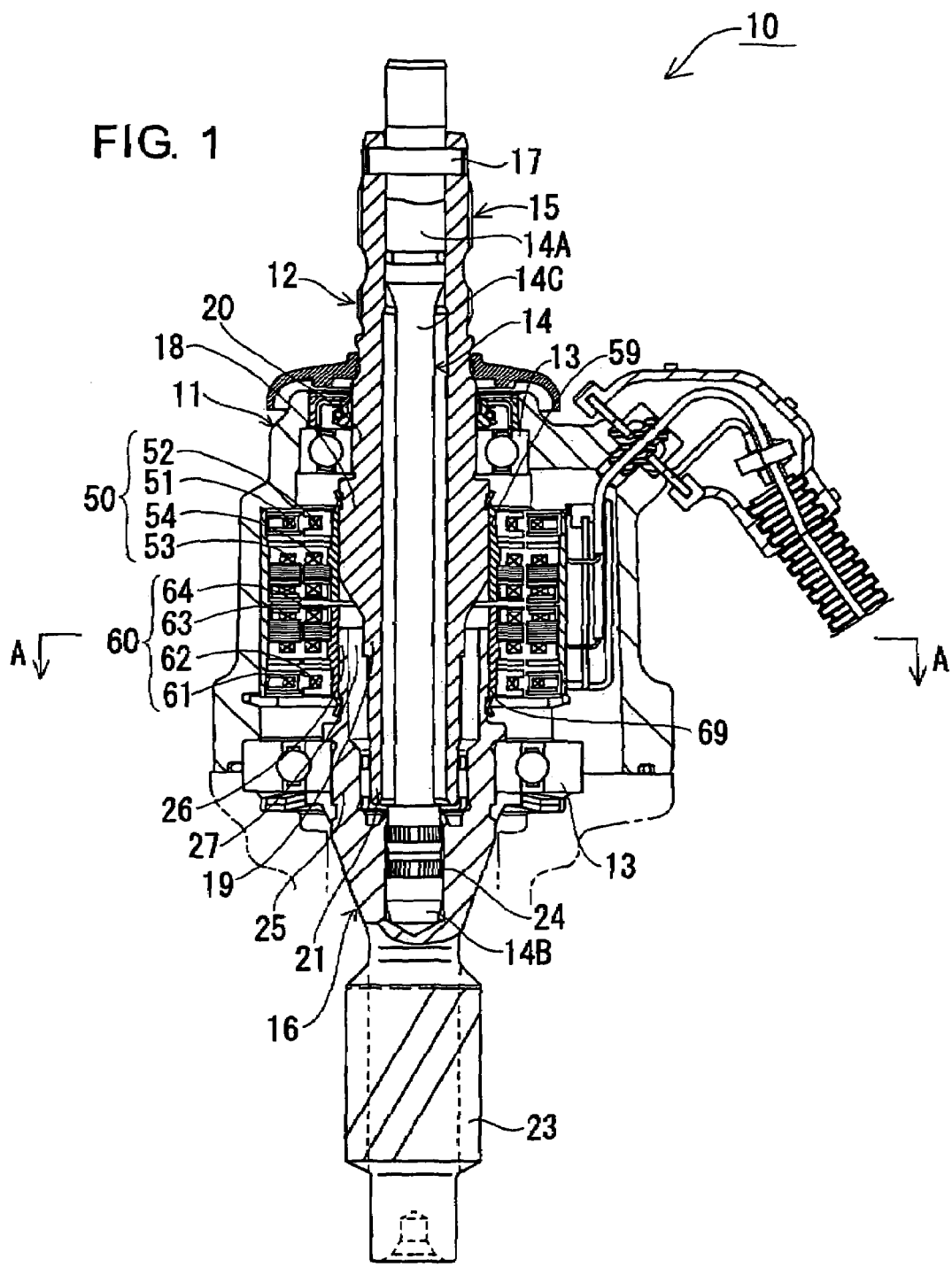
FIG. 1 is a longitudinal sectional view of a resolver-type torque sensor in one embodiment according to the present invention.

Hereafter, a torque sensor and an electric steering device in one embodiment according to the present invention will be described with reference to FIGS. 1 to 5. FIG. 1 shows the general construction of a torque sensor 10 in one embodiment. In FIG. 1, a numeral 11 denotes a cylindrical body, inside which a rotary shaft section 12 passes through and is rotatably supported by means of bearings 13, 13 provided at axial opposite end portions of the cylindrical body 11.

The rotary shaft section 12 is composed of a torsion bar 14 and first and second elongate sleeves 15, 16. An axial mid portion 14C of the torsion bar 14 is made thinner in diameter than the axial opposite ends portions 14A, 14B to be torsionally deformed when a load torque is applied on the torsion bar 14.

The first elongate sleeve 15 encircles almost the entire length of the mid portion 14C with a play and is snugly fit on one end portion 14A of the torsion bar 14 without a substantial clearance therebetween. Hereinafter, the one end portion 14A is referred to as "base end portion 14A", while the other end portion is referred to as "lead end portion 14B". A pin 17 is embedded radially across the fitting portion between the first elongate sleeve 15 and the base end portion 14A of the torsion bar 14, so that the first elongate sleeve 15 and the base end portion 14A of the torsion bar 14 are rotatable bodily.

The outer surface of the first elongate sleeve 15 is provided with a bearing fitting portion 20 on which the bearing 13 is fit, and is further provided with a first resolver fitting portion 18 at the side closer to the lead end portion 14B of the torsion bar 14 than the bearing fitting portion 20. Further, the outer surface of the first elongate sleeve 15 is provided with a first stop portion 19, which is smaller in diameter than the first resolver fitting portion 18, at a portion closer to the lead end portion 14B than the first resolver fitting portion 18 and is also provided with the smallest-diameter portion 21 at a portion which is further closer to the lead end portion 14B.

Figure 2:
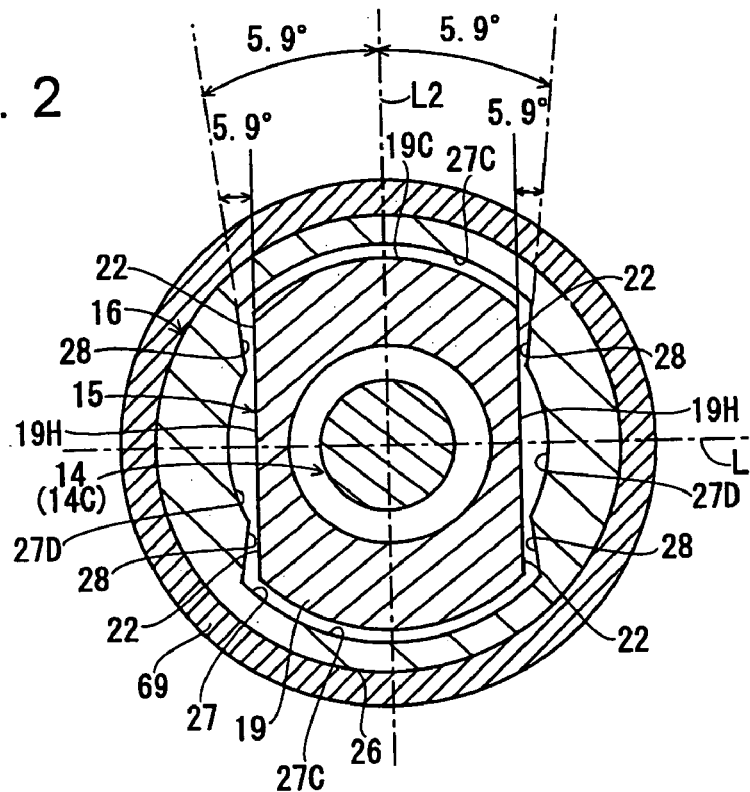
FIG. 2 is an enlarged sectional view of the torque sensor taken along the line A-A in FIG. 1.

As shown in FIG. 2, the first stop portion 19 is constituted by forming a pair of mutually parallel flat surfaces 19H, 19H at opposite ends of diametrically opposed arc surfaces 19C. The opposite end portions at the arc surface 19C sides of the flat surfaces 19H, 19H define four stop points 22 which are engageable with the second elongate sleeve 16, as referred to later.

Referring back to FIG. 1, the second elongate sleeve 16 is bodily formed on one end of a pinion gear 23. The second elongate sleeve 16 has the lead end portion 14B inserted thereinto and partly overlaps the first elongate sleeve 15 thereby to encircle the outer surface of the first stop portion 19 on the first elongate sleeve 15. The lead end portion 14B of the torsion bar 14 is formed with a serration 24, with which the second elongate sleeve 16 are engaged, so that the second elongate sleeve 16 and the lead end portion 14B of the torsion bar 14 are rotatable bodily. Accordingly, the axial mid portion 14C of the torsion bar 14 is twisted as the relative rotation is effected between the first and second elongate sleeves 15,16 which are rotatably bodily respectively with the base and lead end portions 14A, 14B of the torsion bar 14.

The outer surface of the second elongate sleeve 16 is provided thereon with a bearing fitting portion 25 which is fit in the aforementioned bearing 13 and is further provided with a second resolver fitting portion 26 at a position closer to the base end portion 14A of the torsion bar 14 than the bearing fitting portion 25. The second resolver fitting portion 26 has the same outer diameter as the first resolver fitting portion 18. The inside of the second resolver fitting portion 26 is formed as a second stop portion 27, which together with the first stop portion 19 constitute a stop mechanism for defining the maximum torsional angle of the torsion bar 14.

Referring again to FIG. 2, the second stop portion 27 takes the shape which is symmetrical in a vertical direction and in a horizontal direction as viewed in FIG. 2 with respect to a common center axis which is defined by the lines L1, L2 in FIG. 2. The second stop portion 27 is at around the first stop portion 19 and encircles the same with a play. The second stop portion 27 is provided with four stop catching surfaces 28 at positions which respectively face the four stop points 22 of the first stop portion 19.

More specifically, the second stop portion 27 has an internal surface whose section is an almost elongated bore which is similar to the outer profile in cross-section of the first stop portion 19. And, the second stop portion 27 is provided with a pair of circular arc surfaces 27C, 27C which are larger in diameter than the circular arc surfaces 19C, 19C of the first stop portion 19, at diametrically opposite positions in a vertical direction as viewed in FIG. 2. The second stop portion 27 is further provided with a pair of circular arc surfaces 27D, 27D which are smaller in diameter than the circular arc surfaces 19C, 19C, at diametrically opposite positions in a horizontal direction as viewed in FIG. 2. Thus, four stop catching surfaces 28 respectively facing the four stop points 22 of the first stop portion 19 are formed as flat surfaces each of which connects the circular arc surfaces 27C, 27D with each other.

Figure 3:
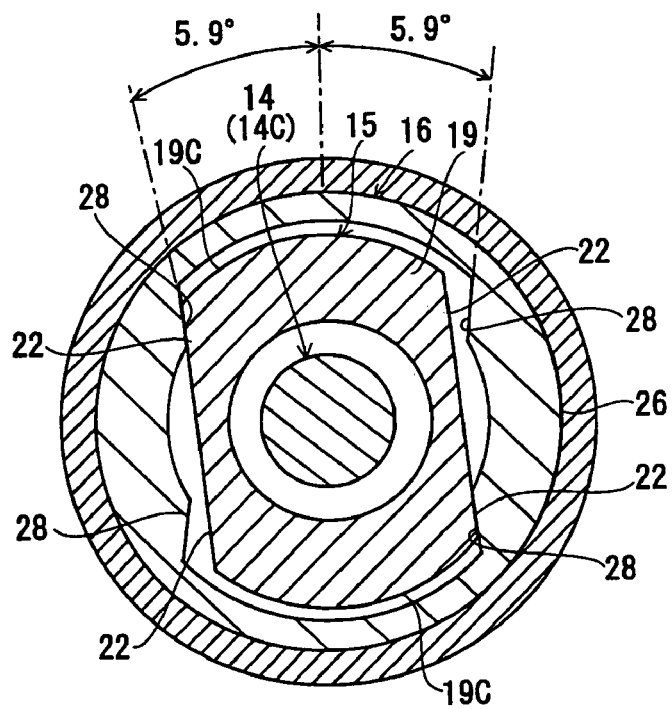
FIG. 3 is an enlarged sectional view similar to that shown in FIG. 2 in the state that a stop portion is in engagement with a stop catching portion.

When the first elongate sleeve 15 is rotated through an angle of 5.9 degrees relative to the second elongate sleeve 16 in a counterclockwise direction to twist the axial mid portion 14C of the torsion bar 14, a pair of the stop points 22, 22 of the first stop portion 19 at point symmetry positions are brought into engagements with a pair of the stop catching surfaces 28, 28 of the second stop portion 27, as shown in FIG. 3. On the contrary, when the first elongate sleeve 15 is rotated through an angle of 5.9 degrees relative to the second elongate sleeve 16 in a clockwise direction to twist the axial mid portion 14C of the torsion bar 14 in the other or opposite direction, another pair of the stop points 22, 22 at point symmetry positions are brought into another pair of the stop catching surfaces 28, 28 of the second stop portion 27.

As shown in FIG. 1, first and second resolvers 50, 60 are provided between the cylindrical body 11 and the rotary shaft section 12. The first resolver 50 is composed of a receiving coil 52 and a moving sensing coil 54 both secured on the outer surface at the first resolver fitting portion 18 of the first elongate sleeve 15 and a feed coil 51 and a stationary sensing coil 53 both secured to the internal surface of the cylindrical body 11. The electromagnetic induction between the feed coil 51 and the receiving coil 52 causes the moving sensing coil 54 to be excited, so that the electrical angle of the rotary shaft section 12 varies in proportion to a change in mutual inductance between the sensing coils 53, 54 which change corresponds to the rotational angle of the rotary shaft section 12. Herein, the stationary and moving sensing coils 53, 54 are constituted by those of five poles. Therefore, seventy-two (72) degrees (=360°/5) in the mechanical angle cover zero through 360 (0-360) degrees in the electrical angle, as indicated by the solid saw wave in FIG. 4(A).

The second resolver 60 is composed of a receiving coil 62 and a moving sensing coil 64 both secured on the outer surface at the second resolver fitting portion 26 of the second elongate sleeve 16 and a feed coil 61 and a stationary sensing coil 63 both secured to the internal surface of the cylindrical body 11. The electromagnetic induction between the feed coil 61 and the receiving coil 62 causes the moving sensing coil 64 to be excited, so that the electrical angle of the rotary shaft section 12 varies in proportion to a change in mutual inductance between the sensing coils 63, 64 which change corresponds to the rotational angle of the rotary shaft section 12. Herein, the stationary and moving sensing coils 63, 64 are constituted by those of six poles. Therefore, sixty (60) degrees (=360°/6) in the mechanical angle cover zero through 360 (0-360) degrees in the electrical angle, as indicated by the broken saw wave in FIG. 4(A).

Further, the receiving coil 62 and the moving sensing coil 64 of the second resolver 60 are fixedly mounted on the circumferential surface of a metallic rotary sleeve 69. This rotary sleeve 69 is press-fit on the second resolver fitting portion 26, whereby the receiving coil 62 and the moving sensing coil 64 are fixedly mounted on the circumferential surface of the second resolver fitting portion 26. Herein, the outer diameter of the rotary sleeve 69 is chosen in the range of, e.g., 18 to 25 millimeters, the thickness of the rotary sleeve 69 is chosen in the range of, e.g., 0.5 to 2.5 millimeters, and an interference for the close or tight fit between the rotary sleeve 69 and the second resolver fitting portion 26 is chosen in the range of, e.g., 0 to 50 micrometers.

In this particular embodiment, the receiving coil 52 and the moving sensing coil 54 of the first resolver 50 are fixedly mounted on the circumferential surface of another metallic rotary sleeve 59, and this rotary sleeve 59 is press-fit on the first resolver fitting portion 18 for tight or interference fit as well.

The torque sensor 10 is constituted as described hereinabove and is assembled in an electric steering device incorporated in a motor vehicle, as shown in FIG. 5. More specifically, the rotary shaft section 12 of the torque sensor 10 is connected to an end of a steering shaft 78 to which a steering handle 71 is secured, and the pinion gear 23 of the rotary shaft section 12 is in meshing engagement with a rack 74 inside an actuator 72. An electric motor (not shown) is built in the actuator 72, and the rotational output of the electric motor is converted into the linear reciprocative movement of the rack 74. The opposite ends of the rack 74 and rotational supports for steered wheels 73, 73 are linked through tie rods 75, 75, respectively Further, the cylindrical body 11 of the torque sensor 10 is secured to a vehicle body, and output leads of the respective resolvers 50, 60 of the torque sensor 10 are connected to an ECU (Electronic Control Unit) 77. The ECU 77 controls the operation of the actuator 72 in dependence upon a load torque of the steering shaft 78 detected by the torque sensor 10. Therefore, the rack 74 to steer the steered wheels 73, 73 is linearly driven by a resultant force which is the sum of a manual steering force the driver exerts on the steering handle 71 and an assist force given by the output of the actuator 72.

Next, the operation of the device as constructed above in the embodiment will be described hereinafter. When the steering handle 71 is rotated, a load torque is exerted on the torsion bar 14 of the torque sensor 10, and the torsion bar 14 is twisted at the mid portion 14C thereof. Thus, the first elongate sleeve 15 rotating bodily with the base end portion 14A of the torsion bar 14 is rotated relative to the second elongate sleeve 16 rotatable bodily with the lead end portion of the torsion bar 14, whereby there arises a difference between the electric angle of the first resolver 50 and the electrical angle of the second resolver 60. The ECU 77 calculates a load torque acting on the rotary shaft portion 12, based on the difference in electrical angle between the resolvers 50 and 60 and alters an output therefrom to the actuator 72 so that the loaded torque on the rotary shaft portion 12, that is, the reaction torque to the steering handle 71 can be adequately altered in dependence on the driving state.

By the way, the first resolver 50 with five poles makes the mechanical angle of seventy-two (72) degrees (=360°/5) cover the electrical angle of 0 to 360 degrees, while the second resolver 60 with six poles make the mechanical angle of sixty (60) degrees (=360°/6) cover 0 to 360 degrees. Therefore, the different (Δθ) in the mechanical angle when the five-pole resolver 50 and the six-pole resolver 60 vary their electrical angles through 360 degrees is represented by the following equation.

$$\Delta\theta = 360° \cdot |1/5 - 1/6| = 12°$$

Thus, the difference between the electrical angles of the first and second resolvers 50, 60 when the rotary shaft section 12 takes the position of a certain mechanical angle becomes the same as that when the rotary shaft section 12 takes the position of another different mechanical angle. That is, the difference in electrical angle between the first and second resolvers 50, 60 becomes the same value even when the rotary shaft section 12 takes either of two different mechanical angle positions, so that there is carried out incorrect detection that two distinct mechanical angle positions cannot be distinguished form each other. More specifically, in a natural state that no torsion or twist stress is applied on the torsion bar 14, the first and second resolvers 50, 60 vary their electrical angles in relation to the mechanical angle, as indicated respectively by the solid and broken saw waves in FIG. 4(A). When the first elongate sleeve 15 is turned in one direction to twist the torsion bar 14 through six degrees (6°), the output of the first resolver 50 shifts six degrees in mechanical angle, as shown by the solid saw wave in FIG. 4(B). Conversely, when the first elongate sleeve 15 is turned in the other direction to twist the torsion bar 14 through six degrees, the output of the first resolver 50 shifts six degrees in mechanical angle, as shown by the solid saw wave in FIG. 4(C). Thus, for example, when the second resolver 60 takes a 60-degree mechanical angle position in the case of FIG. 4(C), the first and second resolvers 50, 60 have 90 degrees as the difference between their electrical angles, and when the second resolver 60 takes a 120-degree mechanical position in the case of FIG. 4(B), the first and second resolvers 50, 60 have 90 degrees as the difference between their electrical angles. Similarly, the 120-degree mechanical angle position on the second resolver 60 in the case of FIG. 4(C) takes the same electrical angle difference (i.e., 150°) as the 180-degree mechanical angle position on the second resolver 60 in the case of FIG. 4(B). In this way, the resolvers 50, 60 at a certain mechanical angle of the second resolver 60 in the case of FIG. 4(C) have the same electrical angle difference as they have at the mechanical angle of the second resolver 60 which is advanced by 60-degree mechanical angle therefrom in the case of FIG. 4(B). For these reasons, a problem arises in that two distinct mechanical angle positions cannot be distinguished form each other.

However, in this particular embodiment, when the torsion bar 14 is twisted through 5.9° in either of the positive and negative-going directions, the first stop portion 19 of the first elongate sleeve 15 is brought into engagement with the second stop portion 27 of the second elongate sleeve 16. As a result, the torsional angle of the torsion bar 14 is limited to a range which is smaller than six (6) degrees in either the positive and negative-going directions to obviate the aforementioned incorrect detection. Accordingly, the electric steering device shown in FIG. 5 can be controlled stably and correctly since it is able to drive the actuator 72 based on the torque detected by the torque sensor 10 which is free of the incorrect detection.

Furthermore, when an excessive torque is exerted on the torsion bar 14 of the torque sensor 10, contact or strike engagement is made between the stop portions 19 and 27 which are provided at the portion where the first elongate sleeve 15 is inserted or fit in the second elongate sleeve 16 with a play. In this event, a stress is concentrated on a thin portion of the second elongate sleeve 16 where the second stop portion 27 is provided. However, in this particular embodiment, the rotary sleeve 69 with the second resolver 60 secured thereon is press-fit on the external surface of the second stop portion 27, so that the mechanical strength can be increased or reinforced at the thin portion or the second stop portion 27 of the second elongate sleeve 16. Accordingly, there can be obviated an accident that the excessive torque exerted on the torsion bar 14 would deform the second elongate sleeve 16.

As described above, in the torque sensor 10 in this particular embodiment, the stop portions 19, 27 are provided at the portion where the first and second elongate sleeves 15, 16 respectively secured to one and the other ends of the torsion bar are fit in each other with a play, and the rotary sleeve 69 with the second resolver 60 secured on the circumferential surface thereof is tightly fit on the circumferential surface of the second stop portion 27 of the second elongate sleeve 16. Thus, the rotary sleeve 69 is used not only for mounting the second resolver 60 thereon but also for reinforcing the mechanical strength of the second elongate sleeve 16. As a consequence, the torque sensor 10 in this particular embodiment can be downsized or miniaturized as a whole, compared to that in the case where the rotary sleeve 69 is not used for such reinforcement.

MODIFICATIONS OR OTHER EMBODIMENTS

The present invention is not limited to the foregoing embodiment. It is to be understood that the following modifications or embodiments described hereafter by way of example also reside within the technical scope of the present invention. Furthermore, the present invention may be practiced in other modified forms than those described hereafter, without departing from the gist of the present invention.

(1) Although the pair of the resolvers 50, 60 in the foregoing embodiment are respectively of the five-pole type and the six-pole type, the numbers in pole of these resolvers may not be limited to five and six, and instead, they may be of any other combination of different numbers.

(2) Although the torque sensor 10 in the foregoing embodiment is used as being assembled in the electric steering device shown in FIG. 5, the torque sensor according to the present invention may be used for other devices than the electric steering device.

Obviously, numerous modifications and variations of the present invention are possible in light of the above teachings. It is therefore to be understood that within the scope of the appended claims, the present invention may be practiced otherwise than as specifically described herein.

What is claimed is:

1. A torque sensor having a torsion bar rotatably provided inside a cylindrical body; a pair of resolvers different in the number of poles for detecting the torsional angle of said torsion bar in the form of electrical angles thereof; and means for measuring a load torque corresponding to the torsional angle of said torsion bar, based on the difference between the detected electrical angles, wherein:

a stop mechanism is provided for defining the maximum torsional angle of said torsion bar; and where the numbers of poles of said resolvers are represented by symbols "n" and "m" and the torsional angle is represented by symbol "θ", then said stop mechanism is constructed to satisfy the following expression $\theta < 180° |1/n - 1/m|$.

2. An electric steering device wherein the torque sensor as set forth in claim 1 is connected to a shaft which is rotated by the manipulation of a steering handle.

* * * * *